July 21, 1942.   S. DEBUS   2,290,169
BREAD SLICING MACHINE
Filed June 20, 1936   3 Sheets-Sheet 1

Inventor
S. Debus

By Emil F. Lange
Attorney

July 21, 1942.  S. DEBUS  2,290,169

BREAD SLICING MACHINE

Filed June 20, 1936  3 Sheets-Sheet 2

Inventor
S. Debus

By Emil F. Lange
Attorney

July 21, 1942.  S. DEBUS  2,290,169
BREAD SLICING MACHINE
Filed June 20, 1936  3 Sheets-Sheet 3
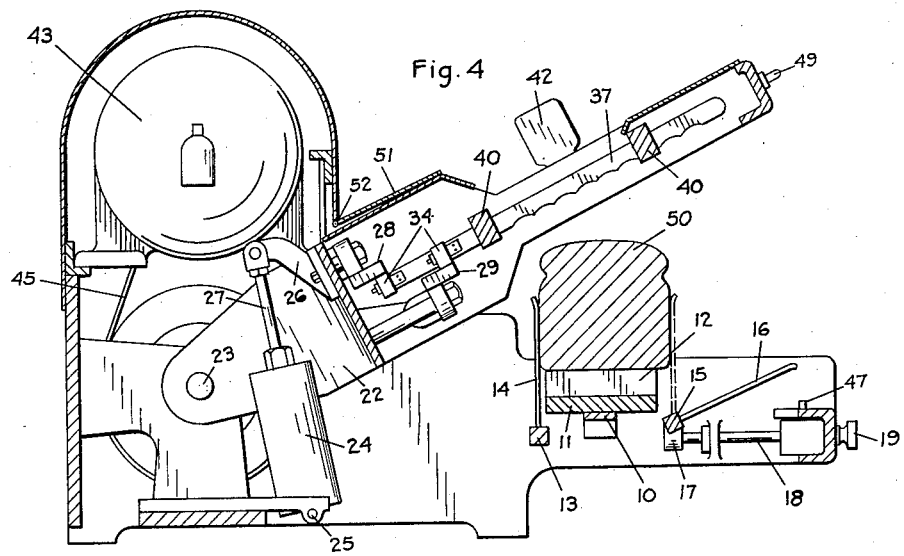
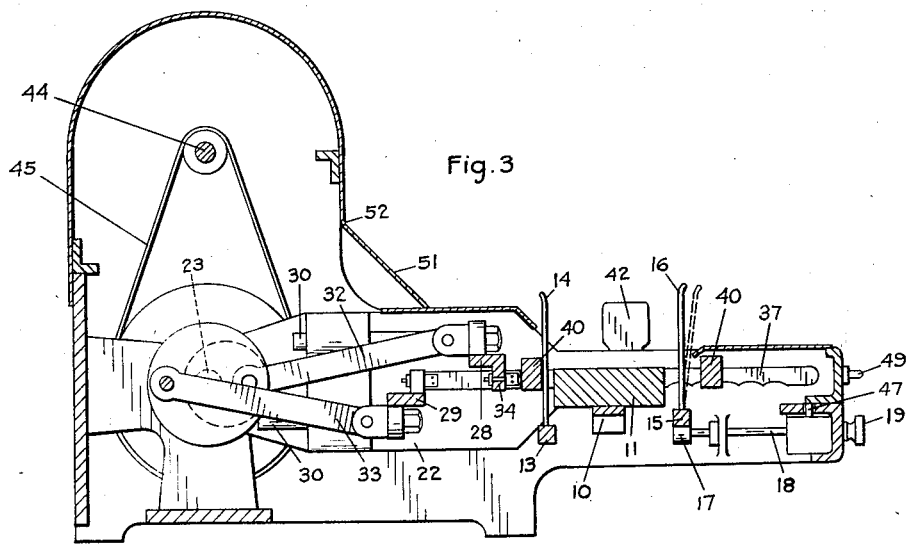
Inventor
S. Debus
By Emil F. Lange
Attorney Patented July 21, 1942

2,290,169

UNITED STATES PATENT OFFICE 2,290,169

BREAD SLICING MACHINE

Sander Debus, Hastings, Nebr., assignor to U. S. Slicing Machine Company, a corporation of Indiana Application June 20, 1936, Serial No. 86,302

7 Claims. (Cl. 146—151)

My invention relates to bread slicing machines of the counter type for slicing individual loaves of bread and adapted particularly for use in small bakeries, stores, hotels and the like.

An object of the invention is the provision of a bread slicing machine having a platform for supporting a bread loaf in stationary position while the reciprocating knives pass through the bread loaf.

Another object of the invention is the provision of a bread slicing machine for the support of a bread loaf in stationary position with the reciprocating knives passing through the bread loaf and then leaving the sliced bread loaf in convenient position to be removed from the machine for wrapping.

Another object of the invention is the provision of a bread slicing machine for maintaining the loaf of bread in stationary position underneath the knives with means for causing the knives to descend during reciprocation against and through the bread loaf.

Another of my objects is the provision of a bread slicing machine in which the loaf of bread is held in stationary position together with a plurality of parallel knives for descending as a unit to and through the bread loaf, combined with means for manually starting in motion the reciprocation of the knives during their descent and means for automatically stopping the reciprocation of the knives when the slicing operation has been completed.

A very important object of the invention is the provision of a plurality of parallel knives in a bread slicing machine, the knives being all secured at one extremity only to a knife bar and projecting therefrom and having no tensioning means or other support at their free end portions.

Another object is the provision of a knife bar in a bread slicing machine for securing a plurality of knives at one extremity only the securing means being especially designed to hold the knives rigidly against vibration but at the same time being of simple construction for the easy removal, insertion or replacement of the knives.

Having in view these objects and others which will be pointed out in the following description, I will now refer to the drawings, in which:

Figure 3 is a sectional view on the line 3—3 of Figure 2, the parts being shown in the position at rest.

Figure 4 is a sectional view on the line 4—4 of Figure 2, the parts being shown in their position immediately before the beginning of the bread slicing operation.

Figure 1:
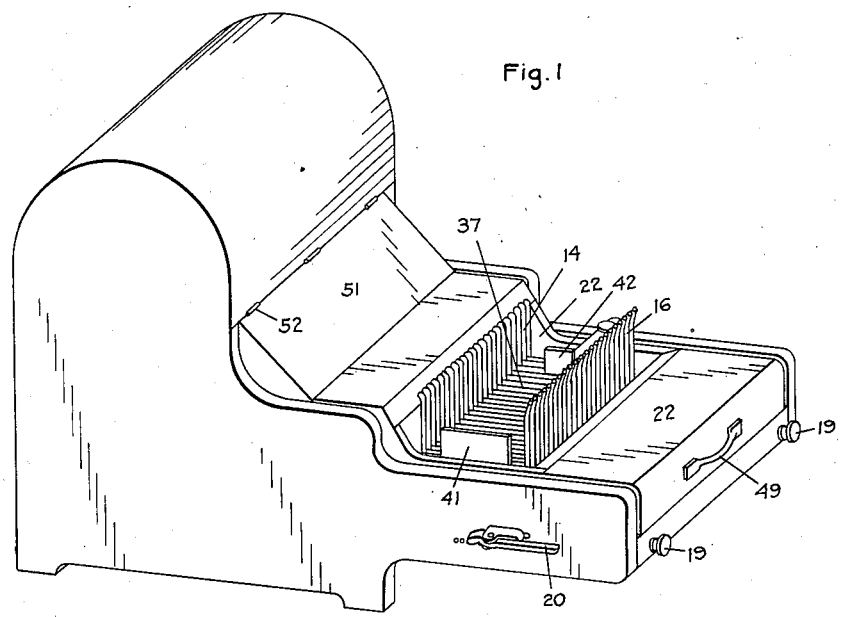
Figure 1 is a view in projection showing my bread slicing machine in its position at rest.
Figure 5:
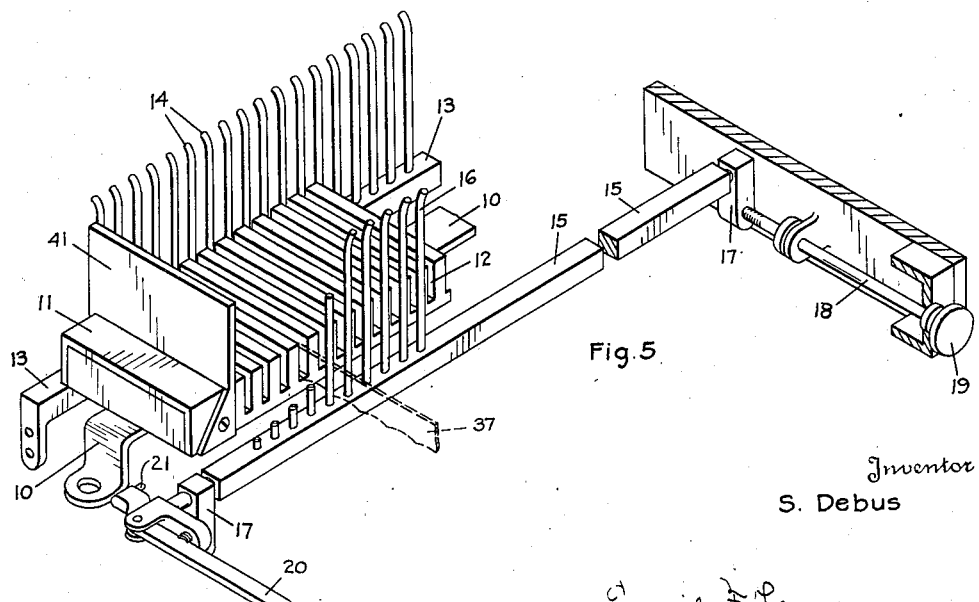
Figure 5 is a view in isometric projection of a broken portion of the bread table and clamping device for holding the loaf of bread in fixed position during slicing.
Figure 2:
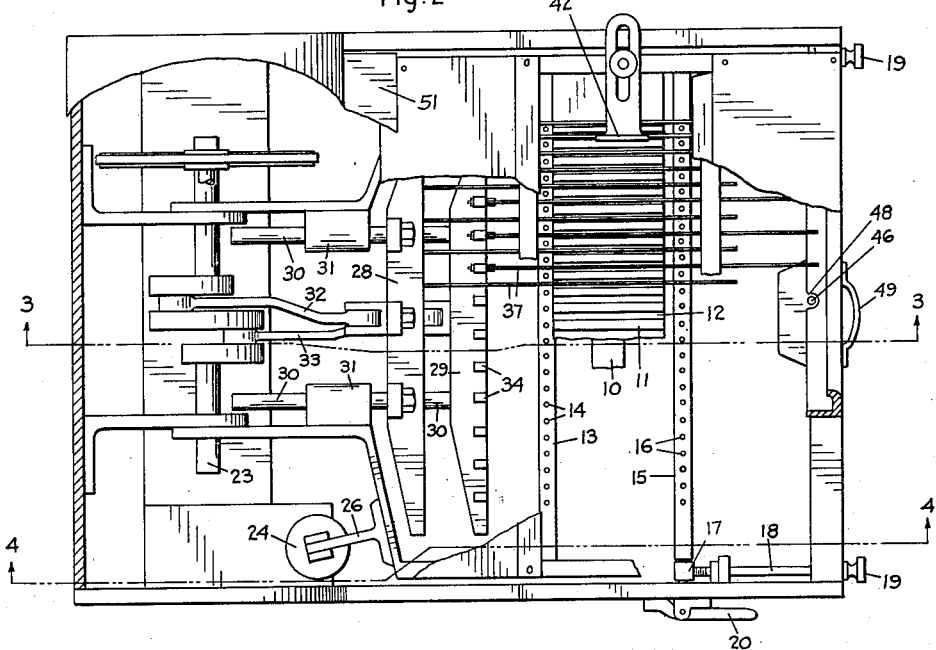
Figure 2 is a plan view of the bread slicing machine, portions being broken or torn away to disclose its interior structure.

The frame has a general appearance shown in Figure 1. The side, front and back members are preferably made from cast material while the coverings are made from sheet material which is bent and formed into the shapes indicated. The frame also includes a transverse member 10 which is secured at its ends to the sides of the frame. The function of the transverse member 10 is to support the bread table or platform 11. This table 11 is deeply slotted at 12, the slots being uniformly spaced and parallel to each other and functioning to receive the knives at the end of the slicing operation. The form of this table 11 is best shown in Figure 5. The depth of the slots is substantially equal to the width of the knives so that the knives enter the slots until their upper edges are substantially flush with the table top. This table is preferably made from a block of wood having strips of sheet aluminum or other suitable material covering the top and front and rear edges of the portions between the slots.

In the rear of the table 11 is a bar 13 having a plurality of tines 14 projecting upwardly therefrom and slightly curved rearwardly as shown in Figures 3 and 4. These tines serve as a comb to bear against one of the sides of the bread loaf but they are spaced relative to the slots of the table and to the knives in a manner such that the knives may operate between the tines 14. At the rear there is another bar 15 having a plurality of tines 16 similar to the tines 14 and corresponding in number and in position to the tines 14. The bar 15 is, however, both slidably and pivotally secured in the frame. The tines 16 normally press against the loaf of bread to lightly clamp the loaf between the tines 14 and 16 as shown in the dotted line position of Figure 4. Since the bread loaves are not of uniform width, it is desirable that an adjustment be provided to adapt the clamp to the bread loaf regardless of its width. For this reason the bar 15 is journalled in a pair of slidable members 17 which are secured to two rods 18 having a screw threaded relation therewith, the rods 18 having knobs 19 within convenient reach of the operator for adjustably sliding the bar 15 backward or forward to its most desirable position for clamping the loaf of bread. The tines 16 are also adjustable angularly as shown in the various views, the adjusting means being best shown in Figure 5 taken with Figure 1. The ends of the bar 15 are journalled in the members 17 with one end projecting through a slot in the frame and terminating in a spring pressed lever 20. This lever is provided with a pin 21 which may seat in sockets in the outer surface of a side wall of the frame. The tines 16 may therefore be swung on their axis by depressing the lever 20 to release the pin 21 from a socket and then applying pressure to the lever 20 to swing the bar 15 on its axis. The purposes of this swinging movement of the tines 16 will be subsequently explained.

A frame 22 is pivotally connected to the shaft 23 and it extends forwardly and over the bread table 11. This frame is adapted to be lifted manually and to descend gravitationally. For retarding the descent for reasons to be subsequently explained, I provide a dashpot 24 which may operate either hydraulically or pneumatically for cushioning the fall and for regulating the descent in accordance with the rapidity of the slicing operation. The dashpot is pivoted at 25 to give it limited arcuate movement to accommodate to the arcuate movement of the frame 22. The arrangement further includes a fixed gooseneck 26 connecting the frame to the piston 27 of the dashpot.

Upper and lower knife bars 28 and 29 are slidably secured in the frame 22. Both the knife bars 28 and 29 are provided with extending rods 30 which slide in guides 31 for providing reciprocatory movements of the bars 28 and 29 without distortion or vibration. The shaft 23 to which the frame 22 is pivotally secured is in effect a crank shaft having two diametrically opposed wrist pins for the links 32 and 33 connected respectively to the knife bars 28 and 29. Since the shaft 23 is a driven shaft the rotary motion of the shaft will be communicated through the links 32 and 33 to reciprocate the knife bars 28 and 29 but in opposite directions. The means for pivotally securing the links 32 and 33 to the knife bars is best shown in the detail in Figure 6.

Figure 6:
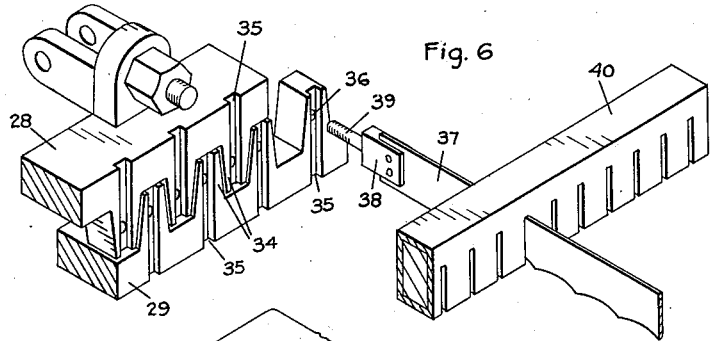
Figure 6 is a view in isometric projection showing the knife bars, the connection of the knives with the knife bars, one of the guides for the knives and the means for securing the operating links to the knife bars.

The knife bars 28 and 29 as best shown in Figure 6 are provided with interengaging tongues 34 which operate in a common plane. Each of these tongues is provided with a groove 35 which extends throughout the depth of the knife bar. Apertures 36 are formed in these grooves to extend through the tongues 34, all of the apertures 36 being in precise horizontal alignment. The knives 37 are each provided at one extremity with a clip 38 which is rigidly secured to the knife and which terminates in a threaded shank 39. The clips 38 seat snugly in the grooves 35 and the shanks 39 pass through the apertures 36 to be drawn tight by means of nuts. This construction provides a very firm securing means for the knives 37 which is necessary to prevent vibration or distortion of the knives due to the fact that the bars 28 and 29 constitute the sole knife frames which makes it impossible to tension the knives as in the prior constructions. Since the apertures 36 are in horizontal alignment, all of the knives 37 must necessarily be in a common horizontal plane but the knives operate in alternation so that any two contiguous knives are always moving in opposite directions.

No tensioning means whatever are provided but the movements of the knives are guided in straight line directions. As shown in Figure 4, two guides 40 are secured at their extremities in the frame 22, these guides being provided with slots for guiding all of the knives of both knife bars. These guides 40 are preferably made from rectangular tubing of aluminum or the like, blocks of oiled wood being driven into the tubing and slots being then cut through the metal casing and through the wood.

Immediately before the beginning of the slicing operation the parts are in the position shown in Figure 4 with the loaf of bread clamped between the two combs 14 and 16. The frame 22 is in inclined position with the knives 37 above the loaf. Reciprocation of the knives takes place during the descent of the frame 22 about its pivot 23. The reciprocation of the knives 37 is rather rapid depending largely on the speed of the shaft 23. This speed however, is limited due to structural factors because of the tendency of the knives 37 to vibrate under excessive speed. The rate of descent of the frame 22 must not be so great as to crush portions of the loaf and it is therefore necessary that the knives 37 operate rapidly enough to clear paths for the knives as the frame 22 descends. The descent of the frame 22 is governed by the dashpot 24 which is so designed that the frame 22 will descend as fast as the knives can operate to slice the bread.

It should also be noted that the knives attack the loaf of bread in its most refractory portion, the upper crust of the loaf. At the beginning of the operation the knives are inclined at a considerable angle to the loaf of bread so that the first cut is through a corner edge of the loaf. As the knives descend they assume a position which gradually approaches the horizontal, which position is reached immediately after the last cut has been made through the loaf. The initial inclination of the knives is highly desirable as being the most effective position for making the initial cut but it is also highly desirable that the inclination gradually changes to the horizontal in order to increase the rapidity of slicing the loaf.

The bread loaf is clamped between the combs 14 and 16 in the direction of thrust of the knives. Since these knives are in opposite reciprocation and since the number of knives moving in one direction is equal to the number of knives moving in the opposite direction, the two forces will balance each other so that a comparatively light clamping action between the combs 14 and 16 is sufficient for holding the loaf of bread in place. At the end of the operation the bread loaf will be individually clamped between a tine 14 and a tine 16. In order to maintain the end slices in substantially upright position and to prevent them from falling over, I provide two clamping members. One of these is designated by the numeral 41, this clamping member being fixed in position on the table 11 as shown in Fig. 5. It serves as a stop for the insertion of the bread loaf. The cooperating member is shown at 42, this being mounted on the frame 22 and being adjustable to increase or decrease the distance between the members 41 and 42. The members 41 and 42 are spaced apart at a distance somewhat greater than the length of the bread loaf since their purpose is not so much to clamp the bread loaf between them as it is to prevent the end slices of bread from topling over.

Figure 7:
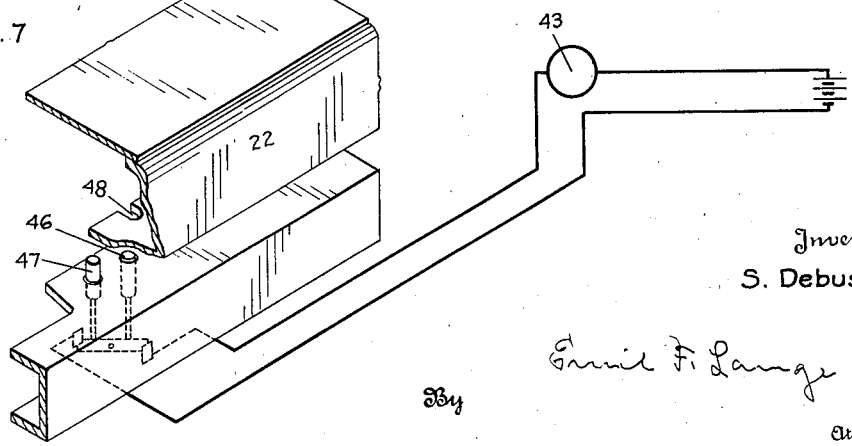
Figure 7 is an isometric view showing the semi-automatic switch for controlling the operation of the motor and showing in diagram the wiring system.

The means for reciprocating the knives includes an electric motor 43 having a shaft 44, this shaft being connected by means of a belt 45 or its equivalent to drive the shaft 23. The driving of the shaft 23 will cause the reciprocation of the links 32 and 33 to reciprocate the knives. The circuit through the motor 43 includes a flush push button switch as shown in Figure 7. The circuit is closed manually by the operator by pushing down on the button 46 when the frame 22 is in its Figure 4 position. The switch includes also another button 47 for breaking the circuit, both buttons being secured in the main frame. The pivoted frame 22 is provided with a notch 48 for receiving the button 46 when the wall of the frame 22 pushes down automatically on the button 47 at the end of the slicing operation. The button 46 will then be pushed up into the notch 48 and since the circuit through the motor 43 is opened at this instant, the reciprocation of the knives is stopped.

When a loaf of bread is to be sliced, the operator grasps the handle to lift the pivoted frame 22 into the position shown in Figure 4 and he then manipulates the lever 20 to throw the comb 16 into the position shown in full lines Figure 4. He then inserts the loaf of bread 50 against the fixed comb 14 and with its end resting against the stop member 41. He then throws the comb 16 into the dotted line position of Figure 4 and presses down on the button 46. This immediately starts the reciprocation of the knives 37 which descend with the frame 22 against and through the bread loaf 50. At the end of the slicing operation the reciprocation of the knives will stop and the bread loaf will have changed its position from underneath the knives to a position above the knives and in convenient access to the operator. He then manipulates the lever 20 to throw the comb 16 into its dotted line position of Figure 3 which releases the bread loaf from all clamping action. The sliced bread loaf may then be lifted as a unit to be transferred to the wrapping table.

The frame itself is very rigid for supporting the motor and the reciprocating knives without vibration. Certain coverings are provided for protecting the various working parts of the machine and for preventing accidents such as might occur if the operator or other individual is careless and should put his fingers into the operating mechanism. The covers in general are made from sheet metal and they are releasably secured to the frame in a manner such that they will fully protect the operator and yet give access to the working parts when these parts require adjustment or repair. The only movable part of the coverings is the plate 51 which must be movable when the frame 22 is elevated, the two positions of the plate 51 being shown in Figures 3 and 4. The plate 51 is pivotally secured at 52 so that it is free to rise when lifting the frame 22 or to fall of its own weight when the frame 22 descends.

Having thus described my invention in such full, clear, and exact terms that its construction and operation will be readily understood by others skilled in the art to which it pertains, what I claim as new and desire to secure by Letters Patent of the United States is:

1. A bread slicing machine including a fixed means for supporting a loaf of bread, said supporting means including means for engaging the longitudinal extending surfaces of the loaf of bread to clamp the bread loaf in fixed position to said supporting means, a plurality of parallel knives adapted to be raised above said supporting means, means for mounting said knives swingingly to have gravitational movement as a unit toward said supporting means, and means for reciprocating alternate knives in opposite directions during the descending movement thereof.

2. A bread slicing machine including a stationary means for supporting a loaf of bread, said supporting means including comb-like members for engaging the bread loaf along longitudinally extending surfaces thereof, said comb-like members being relatively movable to clamp the bread loaf therebetween, a plurality of reciprocable knives above said supporting means, said knives being positioned in the vertical planes of the spaces between the teeth of said comb-like members, a rigid connection between said knives, said knives being movable to an elevated position to permit the insertion of a bread loaf underneath said knives and on said supporting means and being free to descend gravitationally onto and through the bread loaf during the reciprocation of said knives, and automatically operable means for stopping the reciprocation of said knives at the termination of the descending movement thereof.

3. A bread slicing machine including a horizontal table for supporting a loaf of bread during slicing, clamping members secured to said table for engaging the bread loaf at its opposite sides, one of said clamping members being adjustable horizontally for increasing or decreasing the distance between said members and being adjustable angularly to inclined position for the insertion or removal of the bread loaf therefrom, a knife bar above said table, a plurality of parallel knives each secured at one end to said knife bar and projecting therefrom over the bread loaf, said knives and said knife bar being secured to said table to be elevated and to descend under the weight thereof, and means for reciprocating said knives while passing through the loaf of bread.

4. A bread slicing machine including a stationary means for supporting a loaf of bread, said supporting means including comb-like members projecting upwardly and engaging the bread loaf along longitudinally extending surfaces thereof to clamp the bread loaf therebetween, a stop projecting upwardly from said supporting means and contacting the end of the bread loaf for guiding the placement of the bread loaf on said supporting means, a knife frame including a plurality of knives movable as a unit to an elevated position above said supporting means and movable as a unit toward the supporting means, an adjustable stop on said knife frame for contacting the end of the bread loaf opposite said fixed stop when the frame is in lowered position, and means for reciprocating said knives during the descent of said knife frame.

5. A bread slicing machine including a pair of frame members for receiving a loaf of bread therebetween, one of said members being stationary for supporting the loaf of bread, a rotatable shaft pivotally connecting the other of said members to said stationary member, said pivoted member being pivotally movable toward and away from said stationary member, a knife bar slidably secured in said pivoted member, a plurality of parallel knives secured to said knife bar, an eccentric on said shaft, and a link between said eccentric and said knife bar for reciprocating said knife bar and said knives during the reciprocation of said shaft.

6. A bread slicing machine including a bread support, a frame hingedly secured to said support to swing upward relatively thereto, a plurality of cutting knives reciprocably mounted in said frame, said frame and knives being mounted to return by gravity toward said support after being swung upwardly and released, means to reciprocate said knives, and a dashpot interposed between said support and said frame to cushion the return of said frame and knives to prevent crushing of a loaf of bread on said support.

7. A bread slicing machine comprising a main frame, a knife frame pivotally mounted on said main frame for movement to a predetermined raised position, a plurality of spaced knives reciprocally mounted in said knife frame, means for reciprocating said knives during descending movement of said knife frame to effect a bread slicing operation, a support for a loaf of bread mounted on said main frame, said support including comb-like members adapted to engage longitudinally extending portions of a loaf of bread to support the loaf in substantially fixed position on said main frame during slicing, and means mounting one of said comb-like members for angular shifting movement with respect to another member to facilitate insertion and removal of a bread loaf.

SANDER DEBUS.